United States Patent [19]

Yamada et al.

[11] Patent Number: 5,200,374
[45] Date of Patent: Apr. 6, 1993

[54] SIALON-BASED SINTERED BODY AND PROCESS FOR PRODUCING SAME

[75] Inventors: Tetsuo Yamada; Tetsuo Nakayasu, both of Ube; Atsuhiko Tanaka, Yamaguchi; Takuji Takahashi; Yasuhiko Kohtoku, both of Ube, all of Japan

[73] Assignee: Ube Industries, Ltd., Yamaguchi, Japan

[21] Appl. No.: 680,944

[22] Filed: Apr. 5, 1991

[30] Foreign Application Priority Data

| Apr. 6, 1990 | [JP] | Japan | 2-90140 |
| Apr. 17, 1990 | [JP] | Japan | 2-99253 |
| Jun. 5, 1990 | [JP] | Japan | 2-145301 |

[51] Int. Cl.⁵ ............................................. C04B 35/58
[52] U.S. Cl. ........................................ 501/98; 501/97
[58] Field of Search ........................................ 501/97, 98

[56] References Cited

U.S. PATENT DOCUMENTS

| 4,506,020 | 3/1985 | Butler et al. | 501/97 |
| 4,547,470 | 10/1985 | Tanase et al. | 501/98 |
| 4,563,433 | 1/1986 | Yeckley et al. | 501/97 |
| 4,818,635 | 4/1989 | Ekstrom et al. | 501/98 |
| 5,032,553 | 7/1991 | Tarry | 501/97 |

*Primary Examiner*—Mark L. Bell
*Assistant Examiner*—Deborah Jones
*Attorney, Agent, or Firm*—Finnegan, Henderson, Farabow, Garrett and Dunner

[57] ABSTRACT

A SiAlON-based sintered body having a high mechanical strength and fracture toughness, as well as an excellent oxidation resistance, is provided. The SiAlON-based sintered body comprises 5 to 50% by weight of a first crystal phase of RE$\alpha$-SiAlON represented by RE$_x$(Si, Al)$_{12}$(O, N)$_{16}$, where RE stands for at least one modifying rare earth element selected from the group consisting of Ho, Er, Tm, Yb and Lu and x has a value of $0 < x \leq 2$, 30 to 90% by weight of a second crystal phase of $\beta$-SiAlON represented by Si$_{6-z}$Al$_z$O$_z$N$_{8-z}$ ($0 < z \leq 4.2$), and 1 to 50% by weight of a third crystal phase containing at least one rare earth element RE selected from the group consisting of Ho, Er, Tm, Yb and Lu, optionally together with 1 to 20% by weight of a crystal phase of $\alpha$-silicon nitride.

10 Claims, 2 Drawing Sheets

Fig. 2

SIALON-BASED SINTERED BODY AND PROCESS FOR PRODUCING SAME

BACKGROUND OF THE INVENTION

1. Field of the Invention

The present invention relates to a SiAlON-based sintered body useful for obtaining various engineering ceramics having a high mechanical strength and a high toughness, and a process for producing the SiAlON-based sintered body.

2. Description of the Related Art

M$\alpha$-SiAlON is a material having a crystal structure of $\alpha$-silicon nitride ($Si_3N_4$) in which Si is partially substituted by Al and N is partially substituted by O, and a modifying cation M is solid-solved in interstices of the lattice, the M$\alpha$-SiAlON being represented by the formula (I): $M_x(Si, Al)_{12}(O, N)_{16}$ where M stands for Li, Mg, Ca, Y or a lanthanide element and x has a value satisfying $0<x\leq 2$. This M$\alpha$-SiAlON has characteristic properties suitable for an engineering ceramic, such as a high hardness, a low thermal expansion coefficient and an excellent corrosion resistance. Nevertheless, a sintered body of M$\alpha$-SiAlON phase alone does not provide satisfactory characteristics, such as a mechanical strength or fracture toughness, for an engineering ceramic, and one reason therefor is considered to be an equiaxed crystal shape thereof.

To solve the above problems, composite SiAlON-based sintered bodies comprising a M$\alpha$-SiAlON phase having a spherical crystal shape and a $\beta$-SiAlON phase represented by the formula (II): $Si_{6-z}Al_zO_zN_{8-z}$ ($0<z\leq 4.2$), the $\beta$-SiAlON phase having a crystal structure of $\beta$-silicon nitride in which Si is partially substituted by Al and N is partially substituted by O and having a needle-like crystal shape, were proposed in Japanese Unexamined Patent Publication (Kokai) Nos. 58-185485, 58-204875 and 63-233082.

Nevertheless, the mechanical properties of these SiAlON-based sintered bodies are still not satisfactory for high temperature applications. Moreover, although yttrium is common as the modifying cation M, a Y-containing SiAlON-based sintered body has a low oxidation resistance at high temperatures. Therefore, an application of the Y-containing SiAlON-based sintered body to high temperature engine components such as gas turbine parts to be used under severe conditions, is not practical.

The object of the present invention is to solve the above problems and to provide a SiAlON-based sintered body having an excellent oxidation resistance as well as an excellent high temperature strength and toughness.

SUMMARY OF THE INVENTION

To attain the above and other objects, in accordance with the present invention, there is provided a SiAlON-based sintered body, comprising 5 to 50% by weight of a first crystal phase of RE$\alpha$-SiAlON represented by the formula (III): $RE_x(Si, Al)_{12}(O, N)_{16}$ where RE stands for at least one modifying rare earth element selected from the group consisting of Ho, Er, Tm, Yb and Lu and x has a value of $0<x\leq 2$, 30 to 90% by weight of a second crystal phase of $\beta$-SiAlON represented by the formula (II): $Si_{6-z}Al_zO_zN_{8-z}$ ($0<z\leq 4.2$), and up to 50% by weight of a third crystal phase containing at least one rare earth element RE selected from the group consisting of Ho, Er, Tm, Yb and Lu.

Also, there is provided a SiAlON-based sintered body, comprising 5 to 50% by weight of a first crystal phase of RE$\alpha$-sailon represented by $RE_x(Si, Al)_{12}(O, N)_{16}$ where RE stands for at least one modifying rare earth element selected from the group consisting of Ho, Er, Tm, Yb and Lu and x has a value of $0<x\leq 2$, 30 to 90% by weight of a second crystal phase of $\beta$-SiAlON represented by $Si_{6-z}Al_zO_zN_{8-z}$ ($0<z\leq 4.2$), 1 to 50% by weight of a third crystal phase containing at least one rare earth element RE selected from the group consisting of Ho, Er, Tm, Yb and Lu, and 1 to 20% by weight of a crystal phase of $\alpha$-silicon nitride.

DESCRIPTION OF THE PREFERRED EMBODIMENTS

Figure 1:
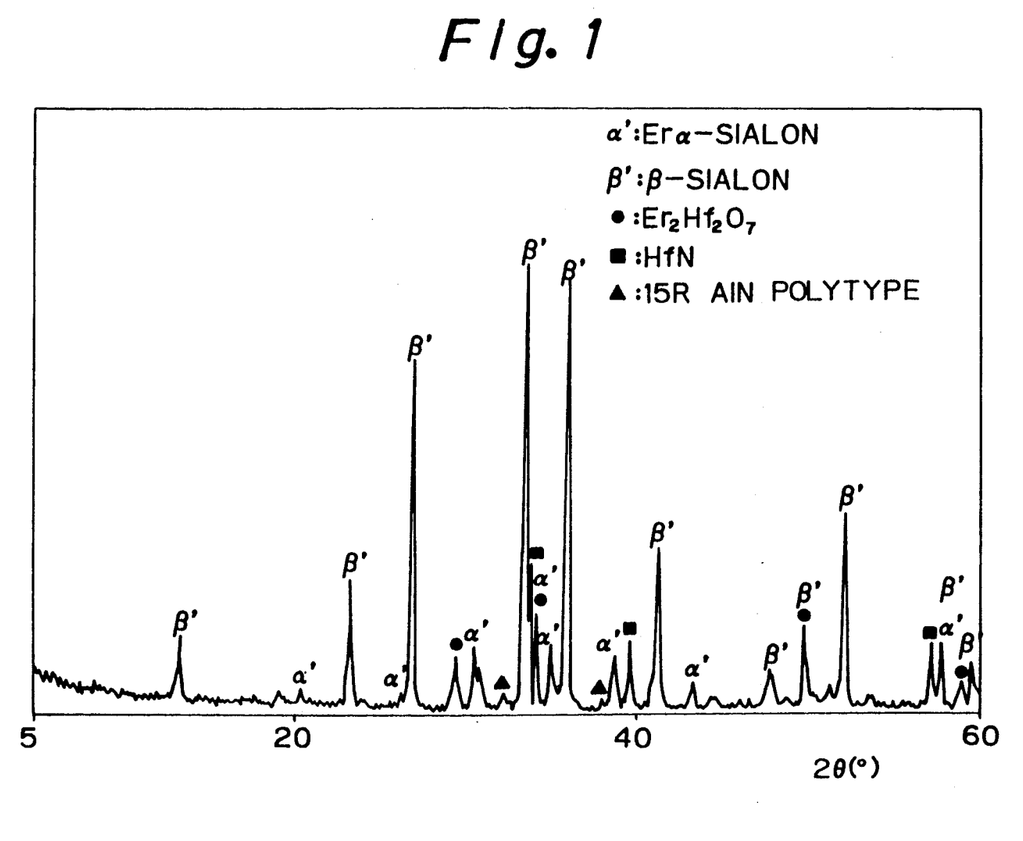
FIGS. 1 and 2 show an X-ray diffraction pattern of the sintered body in the Examples.
Figure 2:
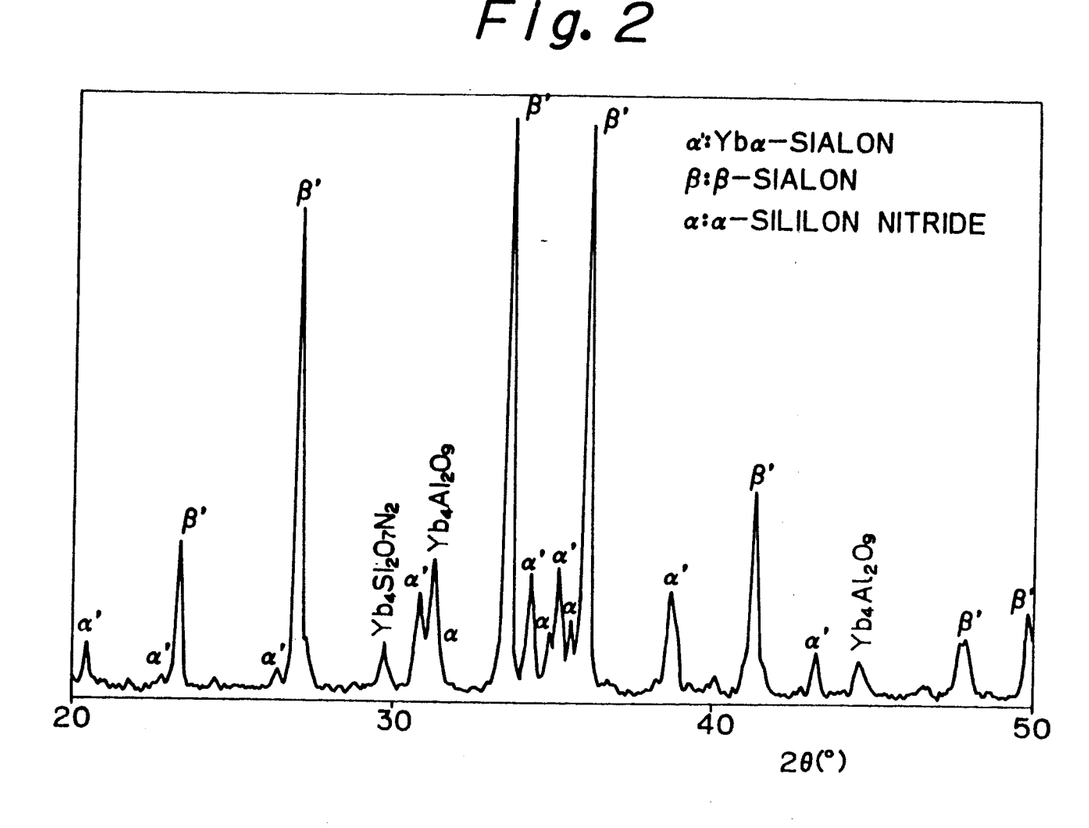

In a SiAlON-based sintered body of the present invention there are essentially three crystal phases, including two of a first crystal phase of RE$\alpha$-SiAlON and a second crystal phase of $\beta$-SiAlON. The RE$\alpha$-SiAlON phase has a composition represented by the formula (III) and the $\beta$-SiAlON phase has a composition represented by the formula (II). The compositions of these phases are not necessarily the same in all crystal grains in the sintered body. As disclosed in Japanese Unexamined Patent Publication (Kokai) No. 58-185485, etc., the M$\alpha$-SiAlON crystal is equiaxed and the $\beta$-SiAlON crystal is needle-like, and by preparing a composite of these crystal phases having different crystal shapes, an improvement of a mechanical strength and a fracture toughness, etc., of the M$\alpha$-SiAlON sintered body is obtained.

The content of the M$\alpha$-SiAlON crystal phase is generally 5 to 50% by weight, preferably 10 to 40% by weight and that of the $\beta$-SiAlON phase is generally 40 to 95% by weight, preferably 50 to 90% by weight. If the content of the M$\alpha$-SiAlON crystal phase is less than 5% by weight, the machanical strength at a high temperature is detriorated. If the content of the M$\alpha$-SiAlON crystal phase is higher than 50% by weight, the mechanical strength and fracture toughness are lowered and not sufficient for engineering applications. The grain size of the M$\alpha$-SiAlON is generally about 0.1 to 5 $\mu$m, preferably 0.2 to 3 $\mu$m. The diameter of the $\beta$-SiAlON needle crystals is also generally 0.1 to 5 $\mu$m, preferably 0.2 to 3 $\mu$m, and the size of the long-axis of needle crystals is 0.5 to 50 $\mu$m, preferably 1 to 30 $\mu$m. The grain size of the M$\alpha$-SiAlON is not critical. If the size is too large, a fracture toughness and a mechanical strength of the SiAlON-based sintered body is deteriorated.

In the RE$\alpha$-SiAlON phase of the present invention, since Ho, Er, Tm, Yb or Lu, whose ionic radius is smaller than that of yttrium of the prior art, is solid-solved in interstices of the $\alpha$-SiAlON lattice, the oxidation resistance of the SiAlON-based sintered body is improved and the SiAlON-based sintered body may be used stably even in an oxygen-containing atmosphere at a high temperature. Particularly, the oxidation resistance of the SiAlON-based sintered body is better when the element solid-solved in the interesices is Er, Tm, Yb or Lu.

The third crystal phase of the SiAlON-based sintered body of the present invention is a crystal phase containing a rare earth element RE, i.e., Ho, Er, Tm, Yb or Lu.

In a first embodiment, the third crystal phase comprises a melilite crystal phase of $RE_2Si_3N_4O_3$, optionally with 15R-type AlN polytype SiAlON crystal phase.

The melilite is an agglomerate of fine crystals grown in the grain boundaries of the sintered body. By the formation of the melilite crystals, the heat resistance of the grain boundaries is remarkably improved and the mechanical strength at a high temperature is increased. Thus, the melilite crystal phase allows an improvement of a mechanical strength of the sintered body. The 15R-type AlN polytype SiAlON crystal phase is not essential to an improvement of the mechanical strength of the sintered body, but it is often formed simultaneously with the melilite phase and does contribute to an improvement of the heat resistance of the grains boudary phase of the sintered body.

The content of the melilite phase together with the AlN polytype SiAlON crystal, if any, is generally up to 10% by weight, preferably 2 to 8% by weight. If the content of these phases is outside of this range, the mechanical strength of the sintered body is lowered and is not-uniform among the sintered bodies.

The sintered body may contain a glass phase, but the content of the glass phase should be less than 5% by weight. If the content of the glass phase is more than 5% by weight, the mechanical strength at a high temperature is lowered.

The thus obtained SiAlON-based sintered body mainly comprises equiaxed and needle-like crystals having a size or diameter of 0.1 to 5 μm which are three-dimensionally cross-linked with each other. In the body, the crystals have thermal expansion coefficients slightly different from each other, and the content of the grain boundary glass phase, one casues for a deterioration of the high temperature characteristics, is extremely low. As a result, the mechanical properties at a high temperature are excellent, and composite effects derived from whisker reinforcement, such as a particle dispersing effect, micro-cracking effect and pull-out effect, are created to increase the fracture toughness.

The sintered body of this embodiment may be produced by preparing a powder mixture of up to 60% by weight of a REα-SiAlON powder mainly composed of a REα-SiAlON phase represented by the formula (III) and containing oxygen in an amount excess to the stoichiometric amount of the formula (III) by up to 8% by weight, and the remainder being a powder composed of silicon, oxygen and nitrogen and containing oxygen in an amount of 1.0 to 5.0% by weight, and then sintering said powder mixture at a maximum temperature in a range of 1600° to 2100° C.

The REα-SiAlON powder may be any powder mainly composed of a REα-SiAlON phase represented by the formula (III), but a powder prepared in accordance with the disclosure of Japanese Patent Publication (Kokai) No. 62-223009, the assignee of which is the assignee of this application, is preferred. This REα-SiAlON powder is prepared by mixing the powders of a) amorphous silicon nitride, b) metal aluminum or aluminum nitride, c) a metal salt which will form an oxide of a rare earth element RE (RE is Ho, Er, Tm, Yb or Lu), the RE being an element to be solid-solved in interstices in α-SiAlON lattice, and optionally, d) an oxygen-containing compound of aluminum or silicon, and heating the mixture in a nitrogen-containing atmosphere at a temperature of 1300° to 1900° C. The thus obtained REα-SiAlON powder has a fine and uniform primary particle size of 0.2 to 2 μm and containing little free carbon and metal impurities. Therefore, the REα-SiAlON powder allows a sintered body without pores and having an extraordinary grain growth to be obtained.

The REα-SiAlON powder used as the starting material in the process of the present invention should contain oxygen in an amount greater than the stoichiometric amount of the formula (III) by 8% by weight or less, preferably 1 to 6.5% by weight, more preferably 2 to 4% by weight. If the amount of excess oxygen is too high, the sintered body contains a considerable amount of a phase having a low melting point, resulting in a deterioration of the mechanical properties.

The method of adding excess oxygen to the REα-SiAlON powder may be, for example, an addition of an oxygen-containing compound of silicon, aluminum or a rare earth element RE to the amorphous silicon nitride in an excess amount in the process of preparing the powder, or a heating of the REα-SiAlON powder in an oxygen-containing atmosphere. In the latter, for example, a REα-SiAlON powder is heated to 800° to 1200° C. in an oxygen-containing atmosphere. This may be carried out, for example, by allowing the REα-SiAlON powder placed on a supporting plate in an oxygen-containing atomosphere for a certain time period, or fluidizing the REα-SiAlON powder in an oxygen-containing atmosphere.

The content of the REα-SiAlON powder in the starting powder mixture is up to 60% by weight, preferably 20 to 50% by weight. If this exceeds 60% by weight, the mechanical strength and the fracture toughness are lowered.

The powder (Si—N—O powder) composed of silicon, oxygen and nitrogen and containing oxygen in an amount of 1.0 to 5.0% by weight may be a single powder containing silicon, oxygen and nitrogen in the particle or a mixture of powders of silicon nitride, silicon oxynitride and silicon dioxide. By using powders containing an adequate amount of oxygen, the volume of a liquid phase having an adequate viscosity formed during heating is increased, whereby a densification is accelerated and a sintered body having a high density is obtained.

A preferable powder is an α-silicon nitride powder containing oxygen in an amount of 1.0 to 5.0% by weight. It is also preferably that, from the viewpoint of sinter-activeness, the α-silicon nitride powder has an average particle size of 1 μm or less and more than 60% of the oxygen exists in a surface layer having a depth of 50 nm of each powder, and the content of metal impurities other than Si which deteriorates the mechanical strength, corrosion resistance and oxidation resistance at a high temperature is not more than 0.1% by weight.

The Si—O—N powder may further contain aluminum or a modifying rare earth element RE. The aluminum or a modifying rare earth element RE may be contained in the Si—O—N powder, or a powder of oxide, nitride or oxynitride of aluminum or a modifying rare earth element RE may be mixed to the Si—O—N powder. The powder containing aluminum or a modifying rare earth element RE preferably does not contain metal impurities other than Si in an amount more than 0.1% by weight.

The content of Si—O—N powder in the starting powder mixture is 40% by weight or more, preferably 60 to 90% by weight. The higher the content of the Si—O—N powder, the higher the content of the β-SiAlON phase in the sintered body. If the content of the Si—O—N powder in the starting powder mixture exceeds 90% by weight, the sintering of the powder mixture becomes difficult and the bulk density of the sintered body is lowered.

The method of preparing a powder mixture is not limited and may be a known method, for example, a dry mixing of the respective starting powders or a combination of a wet mixing of the starting powders in an inactive solvent and removing the solvent. Preferably, the mixing machine is a V-shape mixer (twin-cylinder blender), a ball mill or a vibration mill, etc.

The sintering of the starting powder mixture may be carried out, for example, by forming the dry or wet mixed powders into a desired shape, drying the shaped body if wet mixed, and then sintering it in a an ambient or pressurized nitrogen-containing non-oxidizing atmosphere, or by charging the starting powders in a die having a desired shape and effecting a hot press, or the like. The thus-obtained sintered body may be further subjected to a hot isostatic pressing (HIP), to obtain a further densification of the sintered body.

The forming of the starting powders before the sintering may be carried out by known methods, such as a rubber pressing, a uniaxial pressing, a slip casting, a injection molding, an impact forming, etc.

The sintering temperature is generally 1600° to 2100° C., preferably 1700° to 1900° C., and the sintering time 2100° C., preferably 1700° to 1900° C., and the sintering time is generally 0.5 to 10 hours. If the heating temperature is too low, the sintering does not proceed, and if the sintering temperature is too high, the composition of the sintered body is changed by thermal decomposition.

Thus, in the above process, a SiAlON-based sintered body comprising a RE$\alpha$-SiAlON phase, a β-SiAlON crystal phase and a melilite crystal phase, optionally with a 15R-type AlN polytype SiAlON crystal phase and a glass phase, is obtained. It is considered that a β-SiAlON crystal phase and a melilite crystal phase, optionally with a 15R-type AlN polytype SiAlON crystal phase and a glass phase, are formed by a reaction of the starting RE$\alpha$-SiAlON powder and Si—O—N powder. The resultant RE$\alpha$-SiAlON crystal of the sintered body has a composition in which the value x is slightly less than that of the starting RE$\alpha$-SiAlON powder.

In a second embodiment of the SiAlON-based sintered body of the present invention, the first and second crystal phases of RE$\alpha$-SiAlON and β-SiAlON are the same as in the first embodiment, but preferably the grain size of the RE$\alpha$-SiAlON crystal is 0.1 to 10 μm in average and the long-axis size of the β-SiAlON crystal is 0.5 to 50 μm in average If the grain size of the RE$\alpha$-SiAlON or the size of the long-axis of the β-SiAlON crystal are too large, the mechanical strength and fracture toughness of the SiAlON-based sintered body are deteriorated. In a second embodiment, the third crystal phase is a fine crystal phase of defect-fluorite structure $RE_2M_{2-u}O_{7-2u}$ (RE stands for at least one rare earth element selected from the group consisting of Ho, Er, Tm, Yb and Yb, M stands for at least one of Hf and Zr, and u has a value of $-1<u<1$), optionally together with a fine crystal phase of rock salt structure $MN_v$, where M stands for at least one of Hf and Zr and v has a value of $0.7 \leq v \leq 1.2$.

The fine crystal phase of defect-fluorite structure $RE_2M_{2-u}O_{7-zu}$ is $RE_2Hf_2O_7$, $RE_2Zr_2O_7$ or a solid solution thereof, or a solid solution thereof with $RE_2O_3$, $HfO_2$ to $ZrO_2$. The fine crystal phase of rock salt structure $MN_v$ is HfN, ZrN or a solid solution thereof, or a compound thereof having a non-stoichiometric composition. The shape and size of $RE_2M_{2-u}O_{7-2u}$ and $MN_v$ are not critical, but usually they are present in grain boundary or a triple point as equiaxed or bulky crystals having 0.1 to 10 μm. These fine crystal phases, dispersed in the SiAlON-based matrix or its grain boundary, improve the mechanical properties of the grain boundary phase (a crystalline phase containing $RE_2M_{2-u}O_{7-2u}$ and/or a glass phase containing RE). The content of the fine crystal phase of defect-fluorite structure $RE_2M_{2-u}O_{7-2u}$ is generally 1 to 20% by weight, preferably 2 to 15% by weight. The content of the fine crystal phase of rock salt structure $MN_v$ is generally 0.5 to 10% by weight, preferably 1 to 8% by weight. If the contents of these phases are outside these ranges, the mechanical strength of the sintered body is lowered and becomes not-uniform.

The sintered body of the second embodiment of the present invention may comprise a further crystal phase containing at least one rare earth element RE selected form the group consisting of Ho, Er, Tm, Yb and Lu. This RE-containing crystal phase may be, for example, melilite-type $RE_2Si_3O_3N_4$, apatite-type $RE_{10}(SiO_4)_6N_2$, Wollastonite-type $RESiO_2N$, Woehlerite-type $RE_4Si_2O_7N_2$, garnet-type $RE_3Al_5O_{12}$, mullite-type $RE_4Al_2O_9$, $RE_3AlSi_2O_7N_2$, $RE_2Si_2O_7$, $RE_2SiO_5$, etc. but is not limited thereto. These RE-containing crystal, phases are copresent with a glass phase in the grain boundary of the sintered body. If the content of these crystal phases is increased, the heat resistant of the grain boundary is improved. Thus the RE-containing crystal phase allows an improvement of the mechanical strength of the sintered body. The content of this RE-containing crystal phase is generally up to 10% by weight, preferably 2 to 8% by weight. If the content of this RE-containing crystal phase is more than 10% by weight, the mechanical strength of the sintered body is lowered and is not uniform.

The sintered body of the second embodiment of the present invention preferably further comprises an AlN polytype crystal phase of Al and Si containing complex oxynitrides. The AlN polytype crystal phase of Al and Si containing complex oxynitrides is a group of crystals having a near-AlN composition and a long periodic crystal structure, with Ramsdell symbols such as 15R, 21R, 27R, 8H, 12H and 2H$\delta$. Here, R means the rhombohedral crystal structure and H means the hexagonal crystal structure. These AlN polytype crystals are grown from the Al—Si—O—N containing liquid phase formed at high temperature sintering conditions. The grain size of these crystals is typically 0.1 to 10 μm. The content of the AlN polytype crystal phase is generally up to 10% by weight, preferably 2 to 8% by weight. If the content of the AlN polytype crystal phase is more than 10% by weight, the mechanical strength of the sintered body is lowered and is not uniform.

The sintered body may contain a glass phase, but the weight. If the content of the glass phase is more than 5% by weight, the mechanical strength of the sintered body at a high temperature is lowered.

The thus obtained SiAlON-based sintered body comprises a matrix of RE$\alpha$-SiAlON crystals, β-SiAlON crystals, and AlN polytype crystals of Al and Si containing complex oxynitrides, a grain boundary phase of RE-containing crystals and defect-fluorite-type $RE_2M$-

$_{2-u}O_{7-2u}$ fine crystals and/or a glass phase, and a dispersing phase of rock salt-type $MN_y$ fine crystals. The dispersing phase may be a part of the matrix and/or a grain-boundary phase.

As described before, the $RE_2M_{2-u}O_{7-2u}$ and $MN_y$ fine crystals improve the strength of the grain boundary phase, particularly the heat resistance of the glass phase, and provide excellent mechanical properties at a high temperature. The sintered body comprises various phases different in composition, crystal or amorphous, grain shape, grain size and thermal expansion coefficient, and as a result, fine micro-cracks are formed in the sintered body due to micro-strains after sintering. The above fine cracks, in combination with the reinforcing effect and the crack propagation preventing effect by the cross linking of the needle-like and equiaxed crystals, provide an improvement of the mechanical properties, such as a fracture toughness of the obtained sintered body.

The process for producing the above sintered body is not limited, but an example thereof is a process comprising preparing a powder mixture of up to 60% by weight of a RE$\alpha$-SiAlON powder mainly composed of a RE$\alpha$-SiAlON phase represented by the formula (III) and SiAlON phase represented by the formula (III) and containing oxygen in an amount greater than the stoichiometric amount of the formula (III) by up to 8% by weight, and up to 15% by weight of a hafnium nitride powder and/or a zirconium nitride powder, the remainder being a $\alpha$-silicon nitride powder, and then sintering said powder mixture at a maximum temperature in a range of 1600° to 2100° C.

The starting RE$\alpha$-SiAlON powder is the same as described before.

The $\alpha$-silicon nitride powder preferably has an average particle size of 1 $\mu$m or less for sintering, and further preferably the content of impurities which would deteriorate that strength, corrosion resistance and oxidation resistance at a high temperature of the sintered body is less than 0.1% by weight.

The $\alpha$-silicon nitride powder may further contain aluminum or a modifying rare earth element RE. The aluminum or a modifying rare earth element RE may be contained in the $\alpha$-silicon nitride powder, or a powder of oxide, nitride or oxynitride of aluminum or a modifying rare earth element RE may be mixed to the $\alpha$-silicon nitride powder. The powder containing aluminum or a modifying rare earth element RE preferably does not contain metal impurities other than Si in an amount more than 0.1% by weight.

The amount of the $\alpha$-silicon nitride powder in the starting powder mixture is 40% or more, preferably 50 to 90% by weight, more preferably 60 to 80% by weight. In these ranges, the higher the amount of the $\alpha$-silicon nitride powder, the higher the content of the $\beta$-SiAlON phase in the formed sintered body. If the amount of the is more than 90% by weight, the powder mixture is difficult to sinter and the bulk density of the obtained sintered body is lowered.

The starting powder mixture optionally further contains up to 10% by weight of hafnium nitride and/or zirconium nitride. For example, since the fine crystal $MN_y$ is formed by a reaction of the hafnium oxide and/or zirconium oxide in the staring powder mixture with nitrogen gas in the atmosphere during the sintering, the amount of the fine crystal $MN_y$ in the obtained sintered body may be increased be previously adding the hafnium nitride and/or zirconium nitride powder to the starting powder mixture.

The method of mixing, shaping and sintering may be carried out in the same manner as described for the first embodiment, but the sintering temperature is generally 1600° to 2100° C. If the temperature is below 1600° C., it is difficult to obtain a high density SiAlON-based body. If the temperature is above 2100° C., the composition of the sintered body would be changed by a thermal decomposition of SiAlON.

By the above process, there is obtained a SiAlON-based sintered body which comprises a matrix of RE$\alpha$-SiAlON crystals, $\beta$-SiAlON crystals that are considered to be formed by a reaction of the RE$\alpha$-SiAlON and $\alpha$-silicon nitride, and AlN polytype crystals of Al and Si containing complex oxynitrides, a grain boundary phase of RE-containing crystals and fluorite-type $RE_2M_{2-u}O_{7-2u}$ fine crystals and/or a glass phase, and a dispersing phase of rock salt-type $MN_y$ fine crystals, the RE$\alpha$-SiAlON crystal having a composition represented by the formula (III) in which x has a value slightly smaller than that of the starting $\alpha$-SiAlON powder.

In order to form heat resistant crystal phase and glass phase in the grain boundaries of the SiAlON-based sintered body, it is important to form AlN polytype crystals of an Al and Si containing complex oxynitride under the sintering conditions. Therefore, preferably a formation of the AlN polytype crystals is accelerated, for example, by using a RE$\alpha$-SiAlON powder having an excess oxygen amount of 5% by weight or less as the starting RE$\alpha$-SiAlON powder, or by adding an aluminum nitride powder, or by increasing the nitrogen pressure in the sintering atmosphere, etc.

In a third embodiment of the present invention, the SiAlON-based sintered body comprises a first crystal phase of RE$\alpha$-SiAlON, a second crystal phase of $\beta$-SiAlON, another RE-containing crystal phase, and a crystal phase of $\alpha$-silicon nitride.

The first crystal phase of RE$\alpha$-SiAlON, the second crystal phase of $\beta$-SiAlON and the another RE-containing crystal phase are the same as in the first or second embodiment. Namely, the SiAlON-based sintered body of the third embodiment is very similar to the SiAlON-based sintered bodies of the first and second embodiments except that it further comprises a crystal phase of $\alpha$-silicon nitride.

The $\alpha$-silicon nitride crystal is a fine particulate crystal having a size of 0.02 to 2 $\mu$m and would have to be converted to $\beta$-Si$_3$N$_4$ by keeping at a high temperature during sintering. If the sintering is carried out under such conditions that the $\alpha$-Si$_3$N$_4$ remains by shortening the sintering time or lowering the sintering temperature, etc., all grains constituting the sintered body ($\alpha$-SiAlON, $\beta$-SiAlON, etc.) are fine. In a sintered body composed of such fine grains, the size of defects, origins of a fracture, is decreased and the breaking energy is increased, so that the mechanical strength of the sintered body is improved. Further, since there are a plurality of crystal grains having different moduluses in the sintered body, the mechanical strength of the sintered body is improved.

The $\alpha$-silicon nitride crystal preferably has a grain size of 0.02 to 2 $\mu$m, more preferably 0.05 to 1 $\mu$m. If the grain size of the $\alpha$-silicon nitride crystal is larger than 2 $\mu$m, the mechanical strength and fracture toughness of the SiAlON-based sintered body is deteriorated.

Note, in the third embodiment, the long axis size of the REα-SiAlON crystal is generally 0.01 to 10 μm, preferably 0.2 to 5 μm in average, and the long axis size of the β-SiAlON crystal is generally 0.5 to 50 μm, preferably 1 to 30 μm in average. The grain size of the another RE-containing crystal phase is as described in the first and second embodiments.

The content of the α-silicon nitride crystal phase is generally 1 to 40% by weight, preferably 5 to 20% by weight. If the content of the α-silicon nitride crystal phase is less than 1% by weight, the grain growth of the other phases is not suppressed and an improvement of the mechanical properties, toughness, etc. of the sintered body is not obtained. If the content of the α-silicon nitride crystal phase is higher than 40% by weight, the sintering is not proceeded sufficiently and the mechanical strength of the sintered body is lowered.

Note, in the third embodiment, the content of the first crystal phase of REα-SiAlON is generally 5 to 50% by weight, preferably 10 to 40% by weight, the content of the second crystal phase of β-SiAlON is generally 30 to 90% by weight, preferably 40 to 85% by weight, the content of the another RE-containing crystal phase is preferably 1 to 20% by weight, more preferably 2 to 15% by weight.

The SiAlON-based sintered body of the third embodiment comprises β-SiAlON crystals, α-silicon nitride fine crystals (probably not converted from the starting α-silicon nitride), RE-containing crystals and/or a glass phase, as well as REα-SiAlON crystals.

As described above, the α-silicon nitride fine crystals improve the mechanical properties of the sintered body. Further, also in the third embodiment, the sintered body comprises various phases different in composition, crystal or amorphous, grain shape, grain size and thermal expansion coefficient, and as a result, fine micro-cracks are formed in the sintered body due to micro-strains after sintering. In combination with the matrix reinforcing effect and the crack propagation suppressing effect by the three-dimensional cross-linking of the needle-like and equiaxed crystals, the above fine micro-cracks provide an improvement of the mechanical properties, such as a fracture toughness of the obtained sintered body.

The process for producing the above mentioned sintered body is not limited, but an example thereof is a process comprising preparing a powder mixture of up to 60% by weight of a REα-SiAlON powder mainly composed of a REα-SiAlON phase represented by the formula (III) and containing oxygen in an amount excess to the stoichiometric amount of the formula (III) by up to 8% by weight, the remainder being a α-silicon nitride powder, and then firing said powder mixture at a maximum temperature in a range of 1600° to 2100° C.

This process is very similar to the process described for the sintered body of the second embodiment. The difference is that, in the process of the second embodiment, the starting α-silicon nitride reacts with the REα-SiAlON to form β-SiAlON and all of the starting α-silicon nitride is consumed, but in the above process for producing the sintered body of the third embodiment, the starting α-silicon nitride also reacts with the REα-SiAlON to form β-SiAlON but a significant portion of the starting α-silicon nitride remains as an α-silicon nitride phase in the sintered body. This can be attained by lowering the sintered temperature, or shortening the soaking time at a high temperature, or raising the heating rate of the sintering, or using coarse α-silicon nitride powders, typically 0.8 to 5 μm.

Namely, the starting materials, and the steps of mixing, shaping and sintering can be the same as described in the second embodiment, but the composition of the starting powder mixture is slightly changed. By slightly decreasing an amount of excess oxygen of the starting materials, the mass transport during a sintering is suppressed so that α-$Si_3N_4$ remains.

By the above process, there is obtained a SiAlON-based sintered body which comprises a matrix of REα-SiAlON crystals, β-SiAlON crystals that is considered to be formed by a reaction of the REα-SiAlON and α-silicon nitride, and α-silicon nitride crystals that have not been converted, a grain boundary phase of RE-containing crystals and/or a glass phase, the REα-SiAlON crystals having a composition represented by the formula (III) in which x has a value slightly smaller than that of the starting α-SiAlON powder.

In order to improve an oxidation resistance of the SiAlON-based sintered body, it is preferred to precipitate fine crystals of Woehlerite-type $RE_4Si_2O_7N_2$ in grain boundaries of the sintered body.

The thus obtained SiAlON-based sintered bodies of the first, second and third embodiments have improved mechanical characteristics, such as a high temperature strength and fracture toughness as well as a remarkably improved oxidation resistance, in comparison with SiAlON-based sintered bodies in the prior art. Therefore, the obtained SiAlON-based sintered body can be preferably used as highly reliable structural material, particularly in high temperature parts such as a rotor a starter and a burner of a gas turbine engine.

EXAMPLES

Reference Examples 1 to 6

Amorphous silicon nitride powders, rare earth element oxide ($RE_2O_3$) powders and metal aluminum powders, with compositions shown in Table 1, were mixed in a nitrogen-containing atmosphere by a vibration mill for one hour. The mixed powders were charged in a carbon crucible and set in an electric heating-type furnace. In the furnace, the mixed powders were heated from the room temperature to 1200° C. in one hour, from 1200° C. to 1400° C. in 4 hours and from 1400° C. to 1600° C. in 2 hours, to form crystalline REα-SiAlON powders.

The characteristics of the obtained REα-SiAlON powders are shown in Table 1.

EXAMPLES 1 TO 15 AND COMPARATIVE EXAMPLES 1 TO 7

The REα-SiAlON powders obtained in Reference examples 1 to 6 were mixed with α-silicon nitride powders having the following properties:

| | |
|---|---|
| Specific surface area: | 17.5 m$^2$/g |
| Particle shape: | equiaxed crystal |
| Formed phase: | α-phase > 95% |
| Oxygen content: | 2.3% by weight |
| Metal impurities: | less than 500 ppm |

The mixed powders having a composition as shown in Tables 2 and 3 were wet milled in ethanol as a medium in a ball mill for 48 hours, vacuum dried at 80° C., and then formed by cold isostatic pressing at 1.5 tons/cm$^2$. The shaped body was heated in nitrogen atmosphere at normal pressure from room temperature to 1800° C. at a rate of 2° C./min., and then kept at 1800° C. for 4 hours.

The obtained SiAlON-based sintered body had properties shown in Tables 2 and 3.

The bending strengths of the sintered body at the room temperature and 1300° C. were measured by cutting out 100 test pieces 3×4×40 mm in size from the sintered body, and setting the test pieces in a four point bending test jig.

The fracture toughness $K_{IC}$ of the sintered body was measured by the SEPB (single edge pre-cracked beam) method.

As a test of the oxidation resistance of the sintered body, test pieces were heated in air at 1350° C. for 100 hours and the weight gain of the piece due to oxidation, and the bending strength of the piece at room temperature after the oxidation, were measured.

TABLE 1

| | Rare earth element RE | Composition of starting powders (g) | | | Formed α-SiAlON phase (wt %) | Composition of REα-SiAlON powder (wt %)* | | | | | Excess oxygen content (wt %) | Specific surface area (m²/g) | grain shape |
|---|---|---|---|---|---|---|---|---|---|---|---|---|---|
| | | AmorSN | RE₂O₃ | Al | | RE | Si | Al | O | N | | | |
| Reference example 1 | Y | 500 | 64.4 | 66.6 | >90 | 7.4 | 44.6 | 9.9 | 4.8 | 33.3 | 2.8 | 2.5 | equiaxed |
| Reference example 2 | Ho | " | 103.6 | " | >90 | 12.8 | 42.0 | 9.3 | 4.5 | 31.4 | 2.6 | 2.6 | " |
| Reference example 3 | Er | " | 104.8 | " | >90 | 13.0 | 41.7 | 9.4 | 4.8 | 31.1 | 2.9 | 2.3 | " |
| Reference example 4 | Tm | " | 105.8 | " | >90 | 13.1 | 41.9 | 9.3 | 4.6 | 31.1 | 2.7 | 2.8 | " |
| Reference example 5 | Yb | " | 108.1 | " | >95 | 13.4 | 41.7 | 9.2 | 4.7 | 31.0 | 2.8 | 2.4 | " |
| Reference example 6 | Lu | " | 109.1 | " | >95 | 13.5 | 41.6 | 9.3 | 4.7 | 30.9 | 2.9 | 2.2 | " |

AmorSN: Amorphous silicon nitride
*A desired composition is $RE_{0.5}Si_{9.75}Al_{2.25}O_{0.75}N_{15.25-\delta}$ (δ: excess amount of oxygen)

TABLE 2

| | Rare earth element RE | Composition of starting powders (wt %) | | Bulk density (g/cm³) | Formed phases (wt %)* | | | | $K_{IC}$ MPa√m | Bending strength (MPa) | | Room** Temp. strength after oxidation | Weight grain after oxidation (mg/cm³)** |
|---|---|---|---|---|---|---|---|---|---|---|---|---|---|
| | | α-Sia | α-SN | | α-Sia | β-Sia | Melilite | AlN | | Room Temp. | 1300° C. | | |
| Example 1 | Ho | 40 | 60 | 3.281 | >18 | >67 | >4 | >3 | 7.4 | 1340 | 900 | 860 | 0.838 |
| Example 2 | " | 30 | 70 | 3.240 | >14 | >74 | >3 | >3 | 7.6 | 1390 | 920 | 890 | 0.821 |
| Example 3 | Er | 50 | 50 | 3.322 | >26 | >54 | >5 | >4 | 7.2 | 1200 | 890 | 970 | 0.323 |
| Example 4 | " | 40 | 60 | 3.289 | >19 | >66 | >4 | >3 | 8.3 | 1250 | 960 | 1020 | 0.301 |
| Example 5 | " | 30 | 70 | 3.248 | >15 | >73 | >3 | >3 | 7.9 | 1320 | 970 | 1070 | 0.284 |
| Example 6 | " | 20 | 80 | 3.208 | >11 | >80 | >2 | >2 | 7.8 | 1270 | 910 | 1100 | 0.265 |
| Example 7 | Tm | 40 | 60 | 3.274 | >17 | >69 | >4 | >3 | 7.6 | 1360 | 940 | 990 | 0.201 |
| Example 8 | " | 30 | 70 | 3.233 | >13 | >74 | >3 | >3 | 8.5 | 1390 | 990 | 1040 | 0.182 |
| Example 9 | " | 20 | 80 | 3.192 | >9 | >81 | >2 | >2 | 8.2 | 1260 | 890 | 1090 | 0.165 |
| Example 10 | Yb | 40 | 60 | 3.279 | >21 | >64 | >4 | >3 | 7.8 | 1330 | 980 | 1120 | 0.100 |
| Example 11 | " | 30 | 70 | 3.236 | >16 | >71 | >3 | >3 | 8.7 | 1380 | 1010 | 1180 | 0.093 |
| Example 12 | " | 20 | 80 | 3.198 | >13 | >77 | >2 | >2 | 8.6 | 1320 | 970 | 1200 | 0.088 |
| Example 13 | " | 10 | 90 | 3.160 | >7 | >85 | >2 | >1 | 8.0 | 1250 | 900 | 1090 | 0.084 |
| Example 14 | Lu | 40 | 60 | 3.294 | >25 | >59 | >4 | >3 | 8.9 | 1380 | 1000 | 1220 | 0.078 |
| Example 15 | " | 30 | 70 | 3.244 | >17 | >70 | >3 | >3 | 9.5 | 1420 | 1060 | 1250 | 0.070 |

α-Sia: α-SiAlON
α-SN: α-silicon nitride
β-Sia: β-SiAlON
Melilite: $RE_2Si_3N_4O_3$
AlN: 15R-type AlN polytype SiAlON
*The remainder of the formed phases is a glass phase.
**Value measured after heat treating in air at 1350° C. for 100 hours.

TABLE 3

| | Rare earth element RE | Composition of starting powders (wt %) | | Bulk density (g/cm³) | Formed phases (wt %)* | | | | $K_{IC}$ MPa√m | Bending strength (MPa) | | Room** Temp. strength after oxidation | Weight grain after oxidation (mg/cm²)** |
|---|---|---|---|---|---|---|---|---|---|---|---|---|---|
| | | α-Sia | α-SN | | α-Sia | β-Sia | Melilite | AlN | | Room Temp. | 1300° C. | | |
| Comparative Example 1 | Y | 70 | 30 | 3.267 | >55 | >35 | 0 | 0 | 6.4 | 860 | 620 | 570 | 1.147 |
| Comparative Example 2 | " | 40 | 60 | 3.229 | >15 | >70 | >3 | >2 | 7.5 | 1300 | 900 | 600 | 0.981 |
| Com- | Ho | 70 | 30 | 3.406 | >50 | >40 | 0 | 0 | 6.0 | 850 | 570 | 760 | 0.926 |

TABLE 3-continued

| | Rare earth element RE | Composition of starting powders (wt %) | | Bulk density (g/cm³) | Formed phases (wt %)* | | | | $K_{IC}$ MPa $\sqrt{m}$ | Bending strength (MPa) | | Room** Temp. strength after oxidation | Weight grain after oxidation (mg/cm²)** |
|---|---|---|---|---|---|---|---|---|---|---|---|---|---|
| | | α-Sia | α-SN | | α-Sia | β-Sia | Meli-lite | AlN | | Room Temp. | 1300° C. | | |
| parative Example 3 | | | | | | | | | | | | | |
| Comparative Example 4 | Er | 70 | 30 | 3.415 | >52 | >39 | 0 | 0 | 6.1 | 780 | 640 | 740 | 0.521 |
| Comparative Example 5 | Tm | 70 | 30 | 3.408 | >53 | >37 | 0 | 0 | 6.3 | 830 | 590 | 770 | 0.431 |
| Comparative Example 6 | Yb | 70 | 30 | 3.421 | >56 | >36 | 0 | 0 | 6.4 | 850 | 630 | 800 | 0.225 |
| Comparative Example 7 | Lu | 70 | 30 | 3.430 | >58 | >34 | 0 | 0 | 6.2 | 810 | 650 | 780 | 0.174 |

α-Sia: α-SiAlON
α-SN: α-silicon nitride
β-Sia: β-SiAlON
Melilite: $RE_2Si_3N_4O_3$
AlN: 15R-type AlN polytype SiAlON
*The remainder of the formed phases is a glass phase.
**Value measured after heat treating in air at 1350° C. for 100 hours.

EXAMPLES 16 TO 25 AND COMPARATIVE EXAMPLES 8 TO 14

The REα-SiAlON powders used in Examples 1 to 15, α-silicon nitride powders having the following properties:

| Specific surface area: | 10.0 m²/g |
| Particle shape: | equiaxed crystal |
| Formed phase: | α-phas > 95% |
| Oxygen content: | 0.5% by weight |
| Metal impurities: | less than 500 ppm, | and silicon dioxide powders having the following properties:

| Specific surface area: | 8.0 m²/g |
| Particle shape: | equiaxed crystal |
| Metal impurities: | less than 700 ppm, | were combined in a ball mill to have the compositions shown in Tables 4 and 5. The starting powders were wet milled in ethanol as a medium in the ball mill for 48 hours, vacuum dried at 80° C., and then formed by cold isostatic pressing at 1.5 tons/cm². The shaped body was heated in nitrogen atmosphere at normal pressure from the room temperature to 1800° C. at a rate of 2° C./min., and then kept at 1800° C. for 4 hours.

The obtained SiAlON-based sintered body had the properties shown in Tables 4 and 5.

TABLE 4

| | Rare earth element RE | Composition of starting powders (wt %) | | | Bulk density (g/cm³) | Formed phases (wt %)* | | | | $K_{IC}$ MPa $\sqrt{m}$ | Bending strength (MPa) | | Room** Temp. strength after oxidation | Weight grain after oxidation (mg/cm²)** |
|---|---|---|---|---|---|---|---|---|---|---|---|---|---|---|
| | | α-Sia | α-SN | SiO₂ | | α-Sia | β-Sia | Meli-lite | AlN | | Room Temp. | 1300° C. | | |
| Example 16 | Ho | 39 | 58.5 | 2.5 | 3.265 | >19 | >65 | >4 | >3 | 7.6 | 1320 | 910 | 870 | 0.830 |
| Example 17 | Er | 39 | 58.5 | 2.5 | 3.272 | >21 | >63 | >4 | >3 | 7.8 | 1220 | 940 | 920 | 0.311 |
| Example 18 | " | 28.5 | 68 | 3.5 | 3.254 | >13 | >75 | >3 | >3 | 7.5 | 1280 | 960 | 950 | 0.276 |
| Example 19 | " | 19 | 78 | 3.0 | 3.220 | >9 | >81 | >2 | >2 | 7.7 | 1270 | 870 | 900 | 0.259 |
| Example 20 | Tm | 39 | 58.5 | 2.5 | 3.277 | >20 | >65 | >4 | >3 | 7.4 | 1330 | 930 | 970 | 0.215 |
| Example 21 | " | 28.5 | 68 | 3.5 | 3.249 | >15 | >72 | >3 | >3 | 8.2 | 1350 | 980 | 990 | 0.192 |
| Example 22 | Yb | 39 | 58.5 | 2.5 | 3.266 | >23 | >61 | >4 | >3 | 8.5 | 1310 | 970 | 1090 | 0.116 |
| Example 23 | " | 28.5 | 68 | 3.5 | 3.225 | >14 | >73 | >3 | >3 | 8.4 | 1370 | 1010 | 1130 | 0.102 |
| Example 24 | " | 19 | 78 | 3.0 | 3.206 | >12 | >79 | >2 | >2 | 8.1 | 1300 | 960 | 1180 | 0.094 |
| Example 25 | Lu | 39 | 58.5 | 2.5 | 3.278 | >24 | >60 | >4 | >3 | 8.8 | 1400 | 990 | 1200 | 0.087 |

TABLE 4-continued

| Rare earth element RE | Composition of starting powders (wt %) | | | Bulk density (g/cm³) | Formed phases (wt %)* | | | | $K_{IC}$ MPa $\sqrt{m}$ | Bending strength (MPa) | | Room** Temp. strength after oxidation | Weight grain after oxidation (mg/cm²)** |
|---|---|---|---|---|---|---|---|---|---|---|---|---|---|
| | α-Sia | α-SN | SiO₂ | | α-Sia | β-Sia | Melilite | AlN | | Room Temp. | 1300° C. | | |
| ple 25 | | | | | | | | | | | | | |

α-Sia: α-SiAlON
α-SN: α-silicon nitride
β-Sia: β-SiAlON
Melilite: RE₂Si₃N₄O₃
AlN: 15R-type AlN polytype SiAlON
*The remainder of the formed phases is a glass phase.
**Value measured after heat treating in air at 1350° C. for 100 hours.

TABLE 5

| Rare earth element RE | Composition of starting powders (wt %) | | | Bulk density (g/cm³) | Formed phases (wt %)* | | | | $K_{IC}$ MPa $\sqrt{m}$ | Bending strength (MPa) | | Room** Temp. strength after oxidation | Weight grain after oxidation (mg/cm³)** |
|---|---|---|---|---|---|---|---|---|---|---|---|---|---|
| | α-Sia | α-SN | SiO₂ | | α-Sia | β-Sia | Melilite | AlN | | Room Temp. | 1300° C. | | |
| Comparative Example 8 | Y | 40 | 60 | 0 | 2.367 | >35 | >55 | 0 | 0 | 6.2 | 800 | 580 | 350 | 2.873 |
| Comparative Example 9 | " | 39 | 58.5 | 2.5 | 3.090 | >18 | >67 | >3 | >3 | 7.5 | 1250 | 920 | 640 | 0.974 |
| Comparative Example 10 | Ho | 40 | 60 | 0 | 2.752 | >34 | >57 | 0 | 0 | 5.9 | 780 | 500 | 400 | 2.010 |
| Comparative Example 11 | Er | 40 | 60 | 0 | 2.700 | >31 | >60 | 0 | 0 | 6.2 | 700 | 590 | 430 | 1.408 |
| Comparative Example 12 | Tm | 40 | 60 | 0 | 2.795 | >33 | >56 | 0 | 0 | 6.4 | 730 | 520 | 390 | 0.991 |
| Comparative Example 13 | Yb | 40 | 60 | 0 | 2.668 | >36 | >55 | 0 | 0 | 6.3 | 760 | 550 | 450 | 0.637 |
| Comparative Example 14 | Lu | 40 | 60 | 0 | 2.842 | >38 | >50 | 0 | 0 | 6.1 | 750 | 530 | 480 | 0.458 |

α-Sia: α-SiAlON
α-SN: α-silicon nitride
β-Sia: β-SiAlON
Melilite: RE₂Si₃N₄O₃
AlN: 15R-type AlN polytype SiAlON
*The remainder of the formed phases is a glass phase.
**Value measured after heat treating in air at 1350° C. for 100 hours.

EXAMPLES 26 TO 40 AND COMPARATIVE EXAMPLES 15 TO 21

The REα-SiAlON powders used in Examples 1 to 15, α-silicon nitride powders (produced by Ube Industries Ltd.) having the following properties:

| Specific surface area: | 11.5 m²/g |
|---|---|
| Particle shape: | equiaxed crystal |
| Formed phase: | α-phase > 95% |
| Oxygen content: | 1.3% by weight |
| Metal impurities: | less than 500 ppm, | and, hafnium oxide, zirconium oxide, hafnium nitride and zirconium nitride (hafnium oxide to zirconium nitride provided by Herman C. Starck Ltd.) were combined in a ball mill to have the compositions shown in Tables 6 and 7. The combined powders were wet milled in ethanol as a medium in the ball mill for 48 hours, vacuum died at 80° C.

Then, 150 grams of the mixed powders were charged in a boron nitride coated graphite die having an inner diameter of 100 mm. The die was set in a hot apparatus device and was heated from room temperature to 1705° C. at an elevation rate of 200° C./hour under a pressure of 250 kg/cm$^2$, and then kept at 1750° C. and 250 kg/cm$^2$ for one hour.

The bulk density and phase composition of the sintered bodies were measured and are shown in Table 6 and 7.

The properties of the obtained sintered bodies were evaluated in the same manner as in Examples 1 to 15, except that the bending strength at a high temperature was measured at 1400° C. The properties of the sintered bodies are shown in Tables 6 and 7.

The Weibull modulus of the bending strengths at the room temperature were calculated for 50 test pieces, and were 20 to 30 in Examples 16 to 30 and 6 to 10 in Comparative examples 8 to 14.

TABLE 6

| | Rare earth element RE | Composition of starting powders (wt %) | | | | | | | Bulk density (g/cm³) | Formed phases (wt %)* | | | | | | $K_{IC}$ MPa $\sqrt{m}$ | Bending strength (MPa) | | | Weight grain after oxidation (mg/cm²)** |
|---|---|---|---|---|---|---|---|---|---|---|---|---|---|---|---|---|---|---|---|---|
| | | α-Sia | α-SN | HfO₂ | ZrO₂ | HfN | ZrN | | | α-Sia | β-Sia | REMO | MN | ANP | | | Room Temp. | 1400° C. | Room** Temp. strength after oxidation | |
| Example 26 | Ho | 38 | 57 | 5 | 0 | 0 | 0 | 3.588 | 30 | 61 | 5.5 | 1.5 | 2 | 7.6 | 1530 | 790 | 980 | 0.868 |
| Example 27 | " | 29 | 67 | 0 | 4 | 0 | 0 | 3.348 | 19 | 72.5 | 5 | 1.5 | 2 | 7.8 | 1580 | 830 | 1030 | 0.850 |
| Example 28 | Er | 53 | 43 | 1 | 3 | 0 | 2 | 3.498 | 46 | 45.5 | 4 | 2 | 2.5 | 7.5 | 1400 | 760 | 1000 | 0.402 |
| Example 29 | " | 39 | 59 | 0 | 2 | 0 | 0 | 3.352 | 32 | 63 | 2 | 1 | 2 | 8.5 | 1460 | 880 | 1110 | 0.378 |
| Example 30 | " | 29 | 67 | 3 | 0 | 1 | 0 | 3.521 | 20 | 71 | 5 | 2.5 | 1.5 | 8.1 | 1520 | 920 | 1150 | 0.364 |
| Example 31 | " | 19 | 77 | 2 | 2 | 0 | 0 | 3.398 | 9.5 | 82 | 4.5 | 2 | 2 | 8.0 | 1470 | 800 | 1210 | 0.350 |
| Example 32 | Tm | 39 | 59 | 1 | 0.5 | 0.5 | 0 | 3.400 | 30.5 | 65 | 1.5 | 1.5 | 1.5 | 7.8 | 1560 | 910 | 1130 | 0.274 |
| Example 33 | " | 29 | 67 | 4 | 0 | 0 | 0 | 3.492 | 19 | 73 | 5 | 1.5 | 1.5 | 8.7 | 1600 | 900 | 1180 | 0.260 |
| Example 34 | " | 19 | 76 | 0 | 5 | 0 | 0 | 3.325 | 8 | 83 | 5.5 | 1.5 | 2 | 8.4 | 1460 | 810 | 1220 | 0.244 |
| Example 35 | Yb | 39 | 59 | 1 | 1 | 0 | 0 | 3.376 | 32 | 63 | 2 | 1.5 | 1.5 | 8.0 | 1520 | 930 | 1250 | 0.186 |
| Example 36 | " | 29 | 69 | 2 | 0 | 0 | 0 | 3.388 | 20 | 75 | 2 | 1 | 2 | 8.8 | 1540 | 960 | 1280 | 0.172 |
| Example 37 | " | 19 | 78 | 2 | 0 | 1 | 0 | 3.407 | 13 | 81 | 2.5 | 1.5 | 2 | 8.7 | 1510 | 830 | 1330 | 0.165 |
| Example 38 | " | 10 | 87 | 0 | 3 | 0 | 0 | 3.246 | 7 | 88 | 3 | 1 | 1 | 8.2 | 1460 | 750 | 1230 | 0.156 |
| Example 39 | Lu | 39.5 | 59 | 1.5 | 0 | 0 | 0 | 3.375 | 33 | 63 | 1.5 | 1 | 1.5 | 9.1 | 1550 | 970 | 1350 | 0.134 |
| Example 40 | " | 29 | 68 | 2 | 1 | 0 | 0 | 3.412 | 22 | 71 | 3 | 2 | 2 | 9.6 | 1600 | 950 | 1380 | 0.128 |

α-Sia: α-SiAlON
α-SN: α-silicon nitride
β-Sia: β-SiAlON
MN: MN$_x$
ANP: AlN polytype crystal phase formed in Al—Si—O—N system (often mainly comprising 15R-type crystal phase)
*wt % of formed phases except for another RE-containing crystal phase and/or glass phase.
**Value measured after heat treating in air at 1350° C. for 100 hours.

TABLE 7

| | Rare earth element RE | Composition of starting powders (wt %) | | | | | | Bulk density (g/cm³) | Formed phases (wt %)* | | | | | K_IC MPa √m | Bending strength (MPa) | | | Weight grain after oxidation (mg/cm²)** |
| | | α-Sia | α-SN | HfO₂ | ZrO₂ | HfN | ZrN | | α-Sia | β-Sia | REMO | MN | ANP | | Room Temp. | 1400° C. | Room** Temp. strength after oxidation | |
|---|---|---|---|---|---|---|---|---|---|---|---|---|---|---|---|---|---|---|
| Comparative Example 15 | Y | 60 | 40 | 0 | 0 | 0 | 0 | 3.236 | 50 | 50 | 0 | 0 | 0 | 6.4 | 1010 | 380 | 620 | 1.436 |
| Comparative Example 16 | " | 37 | 58 | 2 | 1 | 1 | 1 | 3.454 | 30 | 62.5 | 4 | 2 | 1.5 | 7.5 | 1430 | 850 | 690 | 1.160 |
| Comparative Example 17 | Ho | 60 | 40 | 0 | 0 | 0 | 0 | 3.367 | 47 | 53 | 0 | 0 | 0 | 6.1 | 990 | 440 | 770 | 1.095 |
| Comparative Example 18 | Er | 60 | 40 | 0 | 0 | 0 | 0 | 3.382 | 51 | 49 | 0 | 0 | 0 | 5.6 | 980 | 470 | 740 | 0.487 |
| Comparative Example 19 | Tm | 60 | 40 | 0 | 0 | 0 | 0 | 3.363 | 48 | 52 | 0 | 0 | 0 | 6.0 | 1020 | 490 | 790 | 0.365 |
| Comparative Example 20 | Yb | 60 | 40 | 0 | 0 | 0 | 0 | 3.375 | 53 | 47 | 0 | 0 | 0 | 5.8 | 1030 | 520 | 820 | 0.222 |
| Comparative Example 21 | Lu | 60 | 40 | 0 | 0 | 0 | 0 | 3.392 | 54 | 46 | 0 | 0 | 0 | 6.5 | 1050 | 530 | 840 | 0.155 |

α-Sia: α-SiAlON
α-SN: α-silicon nitride
β-Sia: β-SiAlON
REMO: RE₂M₂₋ₓO₇₋₂ₓ
MN: MN_x
ANP: AlN polytype crystal phase formed in Al—Si—O—N system (often mainly comprising 15R-type crystal phase)
*wt % of formed phases except for another RE-containing crystal phase and/or glass phase.
**Value measured after heat treating in air at 1350° C. for 100 hours.

EXAMPLES 41 TO 55 AND COMPARATIVE EXAMPLES 22 TO 29

The RE$\alpha$-SiAlON powders used in Examples 1 to 15, $\alpha$-silicon nitride powders produced by UBE Industries Ltd., hafnium oxide powders, zirconium oxide powders, hafnium nitride powders and zirconium nitride powders were combined in a ball mill to obtain the compositions shown in Tables 8 and 9. The combined powders were wet milled in ethanol as a medium in the ball mill for 48 hours, vacuum dried at 80° C.

The mixed powders were preliminarily formed into a rectangular shape by a mold having a cross section 50×80 mm in size, and a cold isostatic pressing of the preliminarily shaped body was performed at 1.5 tons/cm$^2$. The shaped body was then heated under the conditions of the temperature and nitrogen gas pressure as shown in Tables 8 and 9, to perform a normal sintering or a gas pressure sintering in an atmosphere.

The properties of the obtained sintered bodies were evaluated in the same manner as in Examples 16 to 30 and are shown in Tables 8 and 9. The Weibull modulus (50 samples) were 18 to 28 in Examples 31 to 45 and 6 to 10 in Comparative examples 22 to 28.

TABLE 8

| | Rare earth element RE | Composition of starting powders (wt %) | | | | | Sintering conditions | | Bulk density (g/cm³) | Formed phases (wt %)* | | | | | | $K_{IC}$ MPa $\sqrt{m}$ | Bending strength (MPa) | | Room** Temp. strength after oxidation | Weight grain after oxidation (mg/cm²)** |
| | | α-Sia | α-SN | HfO₂ | ZrO₂ | AlN | Gas pressure kg/cm²G | Temp. (°C) | | α-Sia | β-Sia | REMO | MN | ANP | | Room Temp. | 1400° C. | | |
|---|---|---|---|---|---|---|---|---|---|---|---|---|---|---|---|---|---|---|---|
| Example 41 | Ho | 38 | 57 | 2 | 3 | 0 | 1 | 1750 | 3.492 | 30 | 61 | 5 | 2 | 2 | 7.6 | 1370 | 760 | 850 | 0.890 |
| Example 42 | " | 28 | 67 | 2 | 2 | 1 | 70 | 1900 | 3.438 | 20 | 71 | 3.5 | 2.5 | 3 | 8.3 | 1310 | 800 | 890 | 0.838 |
| Example 43 | Er | 53 | 44 | 2 | 1 | 0 | 1 | 1720 | 3.488 | 44 | 49 | 3 | 2 | 2 | 7.1 | 1230 | 680 | 980 | 0.425 |
| Example 44 | " | 28 | 67 | 0 | 3 | 2 | 1 | 1780 | 3.340 | 20 | 72 | 3 | 1.5 | 3.5 | 7.0 | 1210 | 700 | 1020 | 0.380 |
| Example 45 | " | 39 | 59 | 2 | 0 | 0 | 70 | 1850 | 3.415 | 32 | 63 | 2 | 1.5 | 1.5 | 8.0 | 1260 | 790 | 1030 | 0.368 |
| Example 46 | " | 19 | 78 | 0 | 3 | 0 | 150 | 1950 | 3.312 | 10.5 | 83 | 2 | 2.5 | 2 | 8.6 | 1190 | 810 | 1080 | 0.332 |
| Example 47 | Tm | 38 | 57 | 2 | 1 | 2 | 1 | 1750 | 3.442 | 30 | 62 | 3.5 | 1.5 | 3 | 7.5 | 1330 | 750 | 970 | 0.285 |
| Example 48 | " | 29 | 68 | 0 | 2 | 1 | 1 | 1780 | 3.304 | 20 | 74 | 2 | 1 | 3 | 7.7 | 1350 | 770 | 1040 | 0.268 |
| Example 49 | " | 19 | 77 | 2 | 0 | 2 | 70 | 1950 | 3.345 | 10 | 83 | 1.5 | 1.5 | 4 | 8.4 | 1280 | 800 | 1080 | 0.240 |
| Example 50 | Yb | 48 | 48 | 2 | 2 | 0 | 1 | 1720 | 3.478 | 39 | 54 | 4 | 2 | 1 | 7.5 | 1220 | 720 | 1120 | 0.190 |
| Example 51 | " | 39 | 59 | 0 | 2 | 0 | 1 | 1780 | 3.338 | 31 | 64.5 | 2 | 1 | 1.5 | 7.3 | 1240 | 760 | 1150 | 0.176 |
| Example 52 | " | 29 | 68 | 2 | 0 | 1 | 70 | 1800 | 3.383 | 21 | 72.5 | 2 | 1.5 | 3 | 8.3 | 1320 | 790 | 1170 | 0.158 |
| Example 53 | " | 18 | 77 | 1 | 2 | 2 | 150 | 2000 | 3.332 | 12 | 79 | 3 | 1.5 | 4.5 | 9.1 | 1220 | 840 | 1200 | 0.145 |
| Example 54 | Lu | 39 | 59 | 2 | 0 | 0 | 1 | 1750 | 3.428 | 32 | 64 | 2 | 2 | 1 | 7.3 | 1230 | 730 | 1180 | 0.140 |
| Example 55 | " | 24 | 72 | 0 | 3 | 1 | 70 | 1900 | 3.310 | 17 | 76 | 2.5 | 2 | 2.5 | 8.6 | 1300 | 860 | 1240 | 0.090 |

α-Sia: α-SiAlON
α-SN: α-silicon nitride
β-Sia: β-SiAlON
REMO: $RE_2M_{2-u}O_{7-2u}$
MN: $MN_v$
ANP: AlN polytype crystal phase formed in Al—Si—O—N system (often mainly comprising 15R-type crystal phase)
*wt % of formed phases except for another RE-containing crystal phase and/or glass phase.
**Value measured after heat treating in air at 1350° C. for 100 hours.

TABLE 9

| | Rare earth element RE | Composition of starting powders (wt %) | | | | | Sintering conditions | | Bulk density (g/cm³) | Formed phases (wt %)* | | | | | | $K_{IC}$ MPa $\sqrt{m}$ | Bending strength (MPa) | | Room** Temp. strength after oxidation | Weight grain after oxidation (mg/cm²)** |
| | | α-Sia | α-SN | HfO₂ | ZrO₂ | AlN | Gas pressure kg/cm²G | Temp. (°C) | | α-Sia | β-Sia | REMO | MN | ANP | | | Room Temp. | 1400° C. | | |
|---|---|---|---|---|---|---|---|---|---|---|---|---|---|---|---|---|---|---|---|---|
| Comparative example 22 | Y | 60 | 40 | 0 | 0 | 0 | 1 | 1750 | 3.198 | 50 | 50 | 0 | 0 | 0 | 5.6 | 880 | 290 | 570 | 1.337 |
| Comparative example 23 | " | 37 | 57 | 0 | 4 | 2 | 1 | 1750 | 3.215 | 30.5 | 60 | 4.5 | 2 | 3 | 7.0 | 1210 | 700 | 600 | 1.225 |
| Comparative example 24 | " | 27 | 68 | 2 | 2 | 1 | 70 | 1900 | 3.207 | 19.5 | 71 | 3.5 | 3 | 3 | 6.9 | 1260 | 810 | 640 | 1.113 |
| Comparative example 25 | Ho | 60 | 40 | 0 | 0 | 0 | 1 | 1750 | 3.322 | 44 | 56 | 0 | 0 | 0 | 5.8 | 880 | 360 | 700 | 1.042 |
| Comparative example 26 | Er | 60 | 40 | 0 | 0 | 0 | 1 | 1750 | 3.330 | 48 | 52 | 0 | 0 | 0 | 5.5 | 870 | 390 | 680 | 0.534 |
| Comparative example 27 | Tm | 60 | 40 | 0 | 0 | 0 | 1 | 1750 | 3.318 | 45 | 55 | 0 | 0 | 0 | 5.8 | 900 | 420 | 740 | 0.396 |
| Comparative example 28 | Yb | 60 | 40 | 0 | 0 | 0 | 1 | 1750 | 3.325 | 50 | 50 | 0 | 0 | 0 | 5.6 | 930 | 450 | 760 | 0.252 |
| Comparative example 29 | Lu | 60 | 40 | 0 | 0 | 0 | 1 | 1750 | 3.330 | 52 | 48 | 0 | 0 | 0 | 6.2 | 950 | 460 | 780 | 0.180 |

α-Sia: α-SlAlON
α-SN: α-silicon nitride
β-Sia: β-SlAlON
REMO: $RE_2M_{2-x}O_{7-2N}$
MN: $MN_x$
ANP: AlN polytype crystal phase formed in Al—Si—O—N system (often mainly comprising 15R-type crystal phase)
*wt % of formed phases except for another RE-containing crystal phase and/or glass phase.

EXAMPLES 56 TO 70 AND COMPARATIVE EXAMPLES 30 TO 36

The REα-SiAlON powders used in Examples 1 to 15 and α-silicon nitride powders (produced by Ube Industries Ltd.) having the following properties:

| | |
|---|---|
| Specific surface area: | 11.5 m²/g |
| Particle shape: | equiaxed crystal |
| Formed phase: | α-phase > 95% |
| Metal impurities: | less than 500 ppm, | were combined in a ball mill as to obtain compositions shown in Tables 10 and 11. The combined powders were wet milled in ethanol as a medium in the ball mill for 48 hours, and vacuum dried at 80° C.

The mixed powders were preliminarily formed into a rectangular shape by a mold having a cross section 50×80 mm in size, and a cold isostatic pressing of the preliminarily shaped body was performed at 1.5 tons/cm². The shaped body was then heated in an electric furnace under a nitrogen atmosphere at the normal pressure from room temperature to 1750° C. at an elevating rate of 2° C./min., and then kept at 1750° C. for 4 hours.

The bulk densities and phase compositions of the obtained sintered bodies were measured and are shown in Tables 10 and 11.

The properties of the obtained sintered bodies were evaluated in the same manner as in Examples 16 to 30 and are shown in Tables 10 and 11.

TABLE 10

| | Rare earth element RE | Composition of starting powders (wt %) | | Bulk density (g/cm³) | Formed phases (wt %)* | | | | $K_{IC}$ MPa $\sqrt{m}$ | Bending strength (MPa) | | Room** Temp. strength after oxidation | Weight grain after oxidation (mg/cm²)** |
|---|---|---|---|---|---|---|---|---|---|---|---|---|---|
| | | α-Sia | α-SN | | α-SN | α-Sia | β-Sia | Another*** | | Room Temp. | 1300° C. | | |
| Example 56 | Ho | 40 | 60 | 3.279 | >8 | >19 | >58 | >3 | 8.4 | 1390 | 870 | 890 | 0.796 |
| Example 57 | " | 30 | 70 | 3.242 | >5 | >14 | >69 | >3 | 8.6 | 1440 | 890 | 920 | 0.780 |
| Example 58 | Er | 50 | 50 | 3.320 | >13 | >26 | >45 | >4 | 8.2 | 1250 | 900 | 960 | 0.307 |
| Example 59 | " | 40 | 60 | 3.291 | >9 | >18 | >59 | >3 | 9.3 | 1300 | 960 | 1020 | 0.286 |
| Example 60 | " | 30 | 70 | 3.246 | >7 | >13 | >68 | >3 | 8.9 | 1370 | 950 | 1090 | 0.270 |
| Example 61 | " | 20 | 80 | 3.210 | >4 | >10 | >75 | >2 | 8.8 | 1320 | 920 | 1030 | 0.252 |
| Example 62 | Tm | 40 | 60 | 3.272 | >10 | >17 | >60 | >3 | 8.6 | 1410 | 940 | 990 | 0.191 |
| Example 63 | " | 30 | 70 | 3.235 | >8 | >13 | >65 | >3 | 9.5 | 1440 | 990 | 1040 | 0.173 |
| Example 64 | " | 20 | 80 | 3.190 | >5 | >9 | >75 | >2 | 9.2 | 1310 | 940 | 1020 | 0.157 |
| Example 65 | Yb | 40 | 60 | 3.281 | >12 | >16 | >60 | >3 | 8.8 | 1380 | 1010 | 1080 | 0.095 |
| Example 66 | " | 30 | 70 | 3.234 | >9 | >12 | >65 | >3 | 9.7 | 1430 | 1050 | 1130 | 0.088 |
| Example 67 | " | 20 | 80 | 3.200 | >5 | >8 | >76 | >2 | 9.6 | 1370 | 1020 | 1130 | 0.084 |
| Example 68 | " | 15 | 85 | 3.172 | >3 | >5 | >83 | >1 | 9.0 | 1300 | 920 | 1010 | 0.080 |
| Example 69 | Lu | 40 | 60 | 3.296 | >15 | >20 | >51 | >3 | 9.9 | 1430 | 1050 | 1160 | 0.074 |
| Example 70 | " | 30 | 70 | 3.242 | >10 | >17 | >61 | >3 | 10.5 | 1470 | 1090 | 1180 | 0.067 |

α-Sia: α-SiAlON
α-SN: α-silicon nitride
β-Sia: β-SiAlON
*The remainder of the formed phases is a glass phase.
**Value measured after heat treating in air at 1350° C. for 100 hours.
***RE-contrary crystal phase, etc.

TABLE 11

| | Rare earth element RE | Composition of starting powders (wt %) | | Bulk density (g/cm³) | Formed phases (wt %)* | | | | $K_{IC}$ MPa $\sqrt{m}$ | Bending strength (MPa) | | Room** Temp. strength after oxidation | Weight grain after oxidation (mg/cm²)** |
|---|---|---|---|---|---|---|---|---|---|---|---|---|---|
| | | α-Sia | α-SN | | α-SN | α-Sia | β-Sia | other*** | | Room Temp. | 1300° C. | | |
| Comparative example 30 | Y | 70 | 30 | 3.267 | 0 | >55 | >35 | 0 | 6.4 | 860 | 620 | 550 | 1.417 |
| Comparative example 31 | " | 40 | 60 | 3.219 | >5 | >30 | >53 | >2 | 7.5 | 990 | 610 | 590 | 1.281 |
| Comparative example 32 | Ho | 70 | 30 | 3.406 | 0 | >50 | >40 | 0 | 6.0 | 850 | 570 | 760 | 0.926 |
| Comparative example 33 | Er | 70 | 30 | 3.415 | 0 | >52 | >39 | 0 | 6.1 | 780 | 640 | 740 | 0.521 |
| Comparative example 34 | Tm | 70 | 30 | 3.408 | 0 | >53 | >37 | 0 | 6.3 | 830 | 590 | 770 | 0.431 |
| Comparative example 35 | Yb | 70 | 30 | 3.421 | 0 | >56 | >36 | 0 | 6.4 | 850 | 630 | 800 | 0.225 |
| Comparative | Lu | 70 | 30 | 3.430 | 0 | >58 | >34 | 0 | 6.2 | 810 | 650 | 780 | 0.174 |

TABLE 11-continued

| | Composition of starting powders (wt %) | | Bulk density ($g/cm^3$) | Formed phases (wt %)* | | | | | Bending strength (MPa) | | Weight grain after oxidation ($mg/cm^2$)** |
|---|---|---|---|---|---|---|---|---|---|---|---|
| Rare earth element RE | $\alpha$-Sia | $\alpha$-SN | | $\alpha$-SN | $\alpha$-Sia | $\beta$-Sia | oth-er* | $K_{IC}$ MPa $\sqrt{m}$ | Room Temp. | Room Temp. strength after 1300° C. | after oxidation | example 36

$\alpha$-Sia: $\alpha$-SiAlON
$\alpha$-SN: $\alpha$-silicon nitride
$\beta$-Sia: $\beta$-SiAlON
*The remainder of the formed phases is a glass phase.
**Value measured after heat treating in air at 1350° C. for 100 hours.
***RE-contrary crystal phase, etc.

We claim:

1. A SiAlON-based sintered body, comprising:
   5 to 50% by weight of a first crystal phase of RE$\alpha$-SiAlON represented by RE$_x$(Si, Al)$_{12}$(O, N)$_{16}$ where RE stands for at least one modifying rare earth element, wherein said element is Ho, Er, Tm, Yb, or Lu and x has a value of $0 < x \leq 2$;
   30 to 90% by weight of a second crystal phase of $\beta$-SiAlON represented by Si$_{6-z}$Al$_z$O$_z$N$_{8-z}$ where z has a value of $0 < z \leq 4.2$; and
   2 to 10% by weight of a third crystal phase containing at least one rare earth element RE, wherein said element is Ho, Er, Tm, Yb, or Lu, and wherein said third crystal phase is a melilite crystal phase of RE$_2$Si$_3$N$_4$O$_3$.

2. A SiAlON-based sintered body according to claim 1, further comprising an AlN polytype crystal phase of a complex oxynitride containing aluminum and silicon, the total content of the melilite crystal phase and the AlN polytype crystal phase being up to 10% by weight, the sintered body having a density of not less than 2.5 $g/cm^3$.

3. A SiAlON-based sintered body, comprising:
   5 to 50% by weight of a first crystal phase of RE$\alpha$-SiAlON represented by RE$_x$(Si, Al)$_{12}$(O, N)$_{16}$ where RE stands for at least one modifying rare earth element, wherein said element is Ho, Er, Tm, Yb, or Lu and x has a value of $0 < x \leq 2$;
   30 to 90% by weight of a second crystal phase of $\beta$-SiAlON represented by Si$_{6-z}$Al$_z$O$_z$N$_{8-z}$ where z has a value of $0 < z \leq 4.2$; and
   1 to 20% by weight of a third crystal phase containing at least one rare earth element RE, wherein said element is Ho, Er, Tm Yb or Lu, wherein said third crystal phase is a fine crystal phase of defect-fluorite structure RE$_2$M$_{2-u}$O$_{7-2u}$, where M stands for at least one of Hf and Zr, and u has a value of $-1 < u < 1$.

4. A SiAlON-based sintered body according to claim 3, further comprising a fine crystal phase of rock salt structure MN$_v$ where M stands for at least one of Hf and Zr and v has a value of $0.7 \leq v \leq 1.2$, the content of the MN$_v$ phase being 0.5 to 10% by weight.

5. A SiAlON-based sintered body according to claim 3, further comprising a further crystal phase, wherein said further crystal phase is at least one of RE$_2$Si$_3$N$_4$O$_3$, RE$_{10}$(SiO$_4$)$_6$N$_2$, RESiO$_2$N, RE$_4$Si$_2$O$_7$N$_2$, RE$_3$Al$_5$O$_{12}$, RE$_4$Al$_2$O$_9$, RE$_3$AlSi$_2$O$_7$N$_2$, RE$_2$Si$_2$O$_7$, or RE$_2$SiO$_5$.

6. A SiAlON-based sintered body according to claim 3, further comprising a further crystal phase, wherein said further crystal phase is at least one of RE$_2$Si$_3$N$_4$O$_3$, RE$_{10}$(SiO$_4$)$_6$N$_2$, RESiO$_2$N, RE$_4$Si$_2$O$_7$N$_2$, RE$_3$Al$_5$O$_{12}$, RE$_4$Al$_2$O$_9$, RE$_3$AlSi$_2$O$_7$N$_2$, RE$_2$Si$_2$O$_7$, or RE$_2$SiO$_5$, and an AlN polytype crustal phase of a complex oxynitride containing aluminum and silicon.

7. A SiAlON-based sintered body, comprising:
   5 to 50% by weight of a first crystal phase of RE$\alpha$-SiAlON represented by RE$_x$(Si, Al)$_{12}$(O, N)$_{16}$ where RE stands for at least one modifying rare earth element, wherein said element is Ho, Er, Tm, Yb, or Lu and x has a value of $0 < x \leq 2$;
   30 to 90% by weight of a second crystal phase of $\beta$-SiAlON represented by Si$_{6-z}$Al$_z$O$_z$N$_{8-z}$ where z has a value of $0 < z \leq 4.2$;
   1 to 20% by weight of a third crystal phase, wherein said third crystal phase is at least one of RE$_2$Si$_3$N$_4$O$_3$, RE$_{10}$(SiO$_4$)$_6$N$_2$, RESiO$_2$N, RE$_4$Si$_2$O$_7$N$_2$, RE$_3$Al$_5$O$_{12}$, RE$_4$Al$_2$O$_9$, RE$_3$AlSi$_2$O$_7$N$_2$, RE$_2$Si$_2$O$_7$, or RE$_2$SiO$_5$; and
   1 to 20% by weight of a crystal phase of $\alpha$-silicon nitride.

8. A SiAlON-based sintered body according to claim 7, further comprising an AlN polytype crystal phase of a complex oxynitride containing aluminum and silicon, the total content of the third RE-containing crystal phase and the AlN polytype crystal phase being up to 10% by weight, the sintered body having a bulk density of not less than 2.5 $g/cm^3$.

9. A SiAlON-based sintered ceramic body, comprising:
   5 to 50% by weight of a first crystal phase of RE$\alpha$-SiAlON represented by RE$_x$(Si, Al)$_{12}$(O, N)$_{16}$ where RE stands for at least one modifying rare earth element, wherein said element is Ho, Er, Tm, Yb, or Lu and x has a value of $0 < x < 2$;
   30 to 90% by weight of a second crystal phase of $\beta$-SiAlON represented by Si$_{6-z}$Al$_z$O$_z$N$_{8-z}$ where z has a value of $0 < z < 4.2$;
   1 to 20% by weight of a third crystal phase, wherein said third crystal phase is a fine crystal phase of a fluorite structure RE$_2$M$_{2-u}$O$_{7-2u}$ where Re stands for at least one rare earth element, wherein said element is Ho, Er, Tm, Yb or Lu, M stands for at least one of Hf and Zr, and u has a value of $-1 < u < 1$; and
   1 to 20% by weight of a crystal phase of $\alpha$-silicon nitride.

10. A SiAlON-based sintered body according to claim 9, further comprising a fine crystal phase of rock salt structure MN$_v$ where M stands for at least one of Hf and Zr and v has a value of $0.7 \leq v \leq 1.2$, the content of the MN$_v$ phase being 0.5 to 10% by weight.

* * * * *

UNITED STATES PATENT AND TRADEMARK OFFICE
CERTIFICATE OF CORRECTION

PATENT NO. : 5,200,374
DATED : April 6, 1993
INVENTOR(S) : Yamada, et. al.

It is certified that error appears in the above-indentified patent and that said Letters Patent is hereby corrected as shown below:

Column 31, Claim 3, line 49, "TmYb" should read --Tm, Yb--.
Column 32, Claim 6, line 17, "crustal" should read --crystal--.
Column 32, Claim 9, line 49, "<" should read --$\leqq$--; (second occurrence).
Column 32, Claim 9, line 52, ">" should read --$\leqq$--. (second occurrence).

Signed and Sealed this

Fifteenth Day of March, 1994

*Attest:*

BRUCE LEHMAN

*Attesting Officer*  Commissioner of Patents and Trademarks